3,313,844
PROCESS FOR PREPARATION OF BIS-(β-HYDROXYETHYL) TEREPHTHALATE

Seikichi Matsuhisa, Numazu-shi, Shizuoka-ken, and Yoshio Miyama and Tadao Tsutsumi, Mishima-shi, Shizuoka-ken, Japan, assignors to Toyo Rayon Kabushiki Kaisha, Tokyo, Japan, a corporation of Japan
No Drawing. Filed Sept. 17, 1963, Ser. No. 309,389
Claims priority, application Japan, Sept. 24, 1962, 37/41,827; Oct. 19, 1962, 37/46,311
10 Claims. (Cl. 260—475)

This invention relates to a process for preparation of bis-(β-hydroxyethyl) terephthalate from terephthalonitrile, ethylene glycol, and water, while preventing coloration of the product which heretofore cannot be avoided. More particularly, the invention relates to a process for preparation of bis-(β-hydroxyethyl) terephthalate, which comprises reacting terephthalonitrile, ethylene glycol, and water at a temperature of 100–300° C., preferably 180–280° C., in the presence of an esterification catalyst, with the addition to the reaction system of at least one coloration inhibitor selected from the group consisting of phosphoric acid, phosphorous acid, inorganic phosphates, inorganic phosphites, phosphoric acid esters, phosphorous acid esters, sulphur, inorganic sulphides, organic sulphides, inorganic sulphites, mercaptans and thio-organic acids.

In the past, many methods are known for the production of bis-(β-hydroxyethyl) terephthalate, among which those industrially employed at present utilize ester-interchange reaction between dimethyl terephthalate and ethylene glycol, or esterification of terephthalate acid with ethylene glycol. Again, as a process for synthesizing bis-(β-hydroxyethyl) terephthalate by a single step from the reaction of terephthalonitrile, ethylene glycol and water, British Patent No. 800,875 is known, which is based on the following Formula 1.

The same patent teaches that when terephthalonitrile, water, and ethylene glycol are mixed at the quantitative ratios of:

Ethylene glycol _____ 5–10 mol/mol of nitrile group.
Water _____ 1 mol/mol of nitrile group.

and reacted at the temperatures as will enable the removal of the formed ammonia to the outside of the reaction system (not lower than 150° C.), good results can be obtained. It also names, as the catalysts useful for the reaction, hydroxides of alkali metals and alkali earth metals, weakly acid salts, and basic compounds such as alcoholates, pyridine and ammonia.

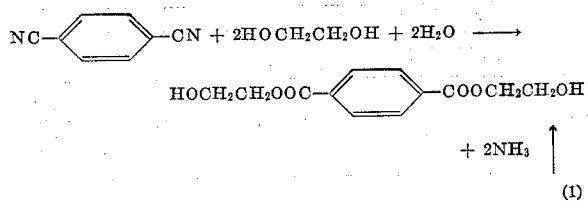

(1)

For production of terephthalonitrile, recently a process of air-oxidation of p-xylene at gaseous phase in the presence of ammonia is developed.

We made extensive studies and experiments in search for a process for an advantageous production of bis-(β-hydroxyethyl) terephthalate while preventing the heretofore inevitable coloration of the product, and as the result found that by carrying out the reaction in the reaction system wherein at least one coloration inhibitor selected from the group consisting of phosphoric acid, phosphorous acid, inorganic phosphates, inorganic phosphites, phosphoric acid esters, phosphorous acid esters, sulphur, inorganic sulphides, organic sulphides, inorganic sulphites, mercaptans and thio-organic acids, is present, the coloration phenomenon can be effectively prevented and bis-(β-hydroxyethyl) terephthalate of markedly improved quality can be obtained.

Still further, it was found that the utility of the present process is not limited to the cases wherein the conventional esterification catalysts are used, but it is also useful in the reaction of the aforesaid Formula 1 using a novel catalyst previously proposed by us, which is composed of at least one metallic compound selected from the group consisting of oxides and salts of copper, zinc, cadmium, mercury, nickel, manganese and cobalt.

It is a well known fact that, generally in the formation of polyesteramides, use of free amine causes coloration of the product. For example, T. M. Laakso and D. D. Reynolds, J.A.C.S. 82 3640 (1960) discloses such. The coloration seen in the synthesis of bis-(β-hydroxyethyl) terephthalate from terephthalonitrile, ethylene glycol, and water, is assumed to be caused by the same mechanism as of the said coloration of polyesteramide, but it is not yet completely understood.

Therefore, the object of the present invention is to provide a process for production of bis-(β-hydroxyethyl) terephthalate whereby, in the synthesis of bis-(β-hydroxyethyl) terephthalate by reaction of terephthalonitrile, ethylene glycol, and water under the presence of an esterification catalyst, the heretofore inevitable coloration of the product can be effectively prevented with industrial advantages.

Other objects of the invention will become clear by reading the rest of the specification.

The above object of the invention can be accomplished by reacting terephthalonitrile, ethylene glycol and water in the presence of an esterification catalyst, at a temperature within the range of 100–300° C., preferably 180–280° C., with the addition to the reaction system of at least one coloration inhibitor selected from the group consisting of phosphoric acid, phosphorous acid, inorganic phosphates, inorganic phosphites, phosphoric acid esters, phosphorous acid esters, sulphur, inorganic sulphides, organic sulphides, inorganic sulphites, mercaptans and thio-organic acids.

According to the invention, bis-(β-hydroxyethyl) terephthalate of excellent color tone can be prepared while preventing heretofore inevitable coloration phenomenon, without any adverse effect on the conversion ratio of terephthalonitrile to bis-(β-hydroxyethyl) terephthalate.

As the catalyst in the process of the invention, besides those esterification catalysts known as having catalytic ability in the reaction of the Formula 1, e.g., hydroxides of alkali metals and alkali earth metals, weakly acid salts, and basic compounds such as pyridine and ammonia, other novel catalyst composed of one or more of compounds selected from oxides and salts of copper, zinc, cadmium, mercury, nickel, manganese and cobalt can be used. As such metallic compound, any of the oxides, inorganic and organic acid salts of the aforesaid metals may be used.

According to the invention, bis-(β-hydroxyethyl terephthalate can be produced with high efficiency while advantageously preventing the coloration of the product in the presence of either the novel catalysts mentioned above, or those known catalysts heretofore used in the reaction of the foregoing Formula 1.

According to the invention, for practice it is preferred to use terephthalonitrile, ethylene glycol and water by the following ratios, that is, in terms of mol ratio, ethylene glycol to nitrile group of 2–12, particularly 5–10, and water to nitrile group, 0.5–5, particularly about 1, and to make the reaction temperature about 100–300° C., particularly 180–280° C. The reaction may be carried out under atmospheric pressure or elevated pressure.

Again the process of the invention is also applicable generally for synthesis of ester by reaction of nitrile with alcohol and water.

As the coloration inhibiting agent useful for the invention, besides phosphoric acid, phosphorous acid, and sulphur, may be named are: inorganic phosphates such as cadmium phosphate, calcium phosphate, sodium phosphate and zinc phosphate; inorganic phosphites such as cadmium phosphite, calcium phosphite, sodium phosphite, potassium phosphite, and copper phosphite; phosphoric acid esters such as triphenyl phosphate, trimethyl phosphate, tributyl phosphate, dibutyl hydrogen phosphate and trihexyl phosphate; phosphorous acid esters such as tributyl phosphite, trihexyl phosphite, diethyl phosphite, triethyl phosphite and monoethyl phosphite; inorganic sulphides such as sodium sulphide, zinc sulphide, ammonium sulphide, diphosphorus pentasulphide, lead sulphide, calcium sulphide, copper sulphide, cadmium sulphide, sodium polysulphide, ammonium polysulphide and potassium polysulphide; organic sulphides such as benzyl sulphide, diphenyl sulphide, tetramethylthiuram disulphide, β-naphthyl disulphide, thioanisole, ethyl sulphide and methyl sulphide; inorganic sulphites such as sodium sulphite, zinc sulphite, calcium sulphite, cobalt sulphite, sodium hydrogen sulphite and potassium hydrogen sulphite; mercaptans such as methylmercaptan, ethylmercaptan, thiophenol; and thio-organic acids such as thiosalicyclic acid, thiobenzoic acid, dithiobenzoic acid and thio-acetic acid.

In the process of the present invention, the amount of use of such a coloration inhibitor is not particularly critical, however, normally it is from about 0.01–1% by weight to the terephthalonitrile used. In order to add the coloration inhibitor to the reaction system and cause its concurrent presence therein, the inhibitor may be added to the reaction materials before the reaction, or may be added to the reaction system at the optional stage of the reaction. However, it is generally preferred that the same be present in the reaction system prior to the initiation of the reaction.

In the following, several embodiments of the present invention will be explained with reference to examples and controls for comparison purpose, it being understood however that the present invention of course should not be limited thereby.

EXAMPLE 1

The following reactants, that is,

| | G. |
|---|---|
| Terephthalonitrile | 20 |
| Ethylene glycol | 98 |
| Water | 6 | were charged to a 500 ml. three-necked flask equipped with a reflux condenser, a stirrer, and a nitrogen inlet tube, together with 0.1 g. of cadmium acetate as a catalyst and 0.1 g. of phosphoric acid as a coloration inhibitor. The flask was then heated under reflux in 220° C. oil bath, while nitrogen saturated with water being simultaneously introduced thereinto. The formed ammonia was led to a 1,000 ml. absorption bottle filled with 1 N sulfuric acid from the front end of the reflux condenser, and absorbed there. After the reaction, the conversion ratio was calculated by back-titration with an aqueous solution of sodium hydroxide. The conversion ratio after 5 hours of the reaction was 95.2%. When the degree of coloration of the reaction liquid was measured at 150° C., its Häzen number was 60.

*Control 1*

For comparison, the above Example 1 was repeated except that the coloration inhibitor was not added. The conversion ratio after the 5 hours' similar heating under reflux was 99.8%, and the reaction liquid was yellowish brown, having a Häzen number of more than 500.

EXAMPLE 2

A test tube provided with a reflux condenser, and a nitrogen inlet tube, was charged with 2 g. of terephthalonitrile, 9.8 g. of ethylene glycol, 0.6 g. of water, 0.01 g. of cupric chloride as the catalyst, and 0.01 g. of cadmium phosphate as a coloration inhibitor. The tube was then heated under reflux in 220° C. oil bath while nitrogen saturated with water being simultaneously introduced thereinto. Thus formed ammonia was led into a 100 ml. absorption bottle filled with 1 N sulfuric acid from the front end of the reflux condenser and absorbed. After the reaction, the conversion ratio was calculated by back-titration with an aqueous solution of sodium hydroxide. The conversion ratio after 5 hours of heating under reflux was 90.5%, and the degree of coloration measured at 150° C. was 70 in Häzen number.

EXAMPLES 3–15

Using the same reactor used in Example 2, the coloration inhibiting effects of various phosphorus compounds were examined under the following conditions. The results were as shown in Table 1 below. Further, the result of the same experiment without the addition of any coloration inhibitor is shown as Control 2.

Reactants:
| | | |
|---|---|---|
| Terephthalonitrile | g | 2 |
| Ethylene glycol | g | 9.8 |
| Water | g | 0.6 |
| Catalyst | g | 0.01 |
| Coloration inhibitor | g | 0.01 |

Reaction conditions:
| | | |
|---|---|---|
| Bath temperature | ° C | 200–220 |
| Reaction period | hrs | 5 |

TABLE 1

| | Catalyst | Coloration inhibitor | Conversion ratio (percent) | Degree of coloration (Häzen number) |
|---|---|---|---|---|
| Control | Sodium methylate | | 87.8 | (1) |
| Example No.: | | | | |
| 3 | Cadmium acetate | Tributyl phosphite | 84.6 | 50 |
| 4 | do | Trihexyl phosphite | 95.6 | 80 |
| 5 | do | Dibutyl hydrogen phosphite | 81.6 | 60 |
| 6 | do | Triphenyl phosphate | 92.3 | 70 |
| 7 | Zinc acetate | Trimethyl phosphate | 85.6 | 40 |
| 8 | do | Phosphorous acid | 85.8 | 80 |
| 9 | do | Tricalcium phosphate | 90.9 | 40 |
| 10 | do | Calcium hypophosphite | 84.8 | 80 |
| 11 | Cuprous chloride | Trihexyl phosphite | 90.6 | 100 |
| 12 | Cupric chloride | Sodium pyrophosphate | 77.1 | 100 |
| 13 | Nickel formate | Dibutyl hydrogen phosphite | 82.2 | 90 |
| 14 | Manganese formate | Trihexyl phosphite | 62.4 | 40 |
| 15 | Cobalt acetate | Triphenyl phosphate | 89.6 | 60 |

[1] Yellowish brown.

NOTE.—In the above Table 1, the degree of coloration (Häzen number) is the result of measurement when the reaction mixture was heated to 150° C.

Control 3

A 500 ml. three-necked flask equipped with a reflux condenser, a stirrer, and a nitrogen inlet tube was charged with 20 g. of terephthalonitrile, 98 g. of ethylene glycol, 6 g. of water, and 0.1 g. of cadmium acetate as a catalyst, and heated under reflux in an oil bath of 220° C. while simultaneously nitrogen saturated with water being introduced thereinto. The formed ammonia was led to a 1,000 ml. of absorption bottle filled with 1 N sulfuric acid from the front end of the reflux condenser and absorbed there. After the reaction was completed, the conversion ratio was calculated by means of a back-titration with an aqueous solution of sodium hydroxide.

The conversion ratio after 5 hours of heating under reflux was 99.8%, and the reaction liquid was yellowish brown in color.

EXAMPLE 16

The experiment of Control 3 was repeated except that 0.1 g. of sulphur was added to the reactants as the coloration inhibitor.

After 5 hours of reaction, the conversion ratio was 96.4%, and the degree of coloration was 60 in Häzen number, when measured at 150° C.

EXAMPLE 17

A test tube equipped with a reflux condenser and a nitrogen inlet tube was charged with 2 g. of terephthalonitrile, 9.8 g. of ethylene glycol, 0.6 g. of water, 0.01 g. of magnesium acetate, and 0.01 g. of thiophenol as the coloration inhibitor, and heated under reflux in an oil bath of 220° C., while nitrogen saturated with water being simultaneously introduced thereinto.

The formed ammonia was led to a 100 ml. absorption bottle filled with 1 N sulfuric acid from the front end of the reflux condenser, and absorbed there. After the reaction was completed, the conversion ratio was calculated by means of a back-titration with an aqueous solution of sodium hydroxide. The conversion ratio after 5 hours of heating under reflux was 87.1%, and the degree of coloration was 50 in Häzen number, when measured at 150° C.

EXAMPLES 18–32

Using the same reactor used in Example 17, the coloration inhibiting effects of various sulphur compounds were examined under the following conditions. The results were as shown in Table 2 below. Further, the result of the same experiment without the addition of any coloration inhibitor is shown as Control 4.

Reactants:
    Terephthalonitrile _____ g__ 2
    Ethylene glycol _____ g__ 9.8
    Water _____ g__ 0.6
    Catalyst _____ g__ 0.01
    Coloration inhibitor _____ g__ 0.01
Reaction conditions:
    Bath temperature _____ ° C__ 200–220
    Reaction period _____ hrs__ 5

TABLE 2

| | Catalyst | Coloration inhibitor | Conversion ratio (percent) | Degree of coloration (Häzen number) |
|---|---|---|---|---|
| Control 4 | Sodium methylate | | 87.8 | (¹) |
| Example No.: | | | | |
| 18 | Zinc acetate | Thiophenol | 95.2 | 50 |
| 19 | ----do---- | Ethyl mercaptan | 92.7 | 50 |
| 20 | ----do---- | Dibenzyl sulphide | 81.1 | 60 |
| 21 | ----do---- | Thiosalicylic acid | 88.2 | 60 |
| 22 | ----do---- | Sodium sulphide | 83.2 | 80 |
| 23 | ----do---- | Ammonium polysulphide | 79.6 | 40 |
| 24 | Sodium acetate | Sulphur | 96.4 | 70 |
| 25 | Magnesium acetate | Tetramethylthiuram disulphide | 86.2 | 70 |
| 26 | Cadmium acetate | Zinc sulphide | 87.5 | 60 |
| 27 | ----do---- | Sodium sulphite | 90.4 | 80 |
| 28 | Cupric chloride | Zinc sulphide | 92.2 | 100 |
| 29 | ----do---- | Dibenzyl sulphide | 82.6 | 90 |
| 30 | Cobalt chloride | Sodium sulphide | 90.9 | 120 |
| 31 | ----do---- | Thiosalicylic acid | 86.1 | 40 |
| 32 | Cobalt acetate | Sodium sulphite | 83.7 | 60 |

¹ Yellowish brown.
NOTE.—In the above Table 2, the degree of coloration (Häzen number) is the result of measurement when the reaction mixture was heated to 150° C.

As is all the more clear from the results of Tables 1 and 2, according to the present invention, it is possible to produce bis-(β-hydroxyethyl) terephthalate industrially with advantage, while preventing the heretofore inevitable coloration phenomenon.

What is claimed is:

1. Process for preparation of bis-(β-hydroxyethyl) terephthalate which comprises reacting terephthalonitrile, ethylene glycol and water in the presence of an esterification catalyst, at a temperature of 100–300° C., with addition to the reaction system and co-presence therein of at least one coloration inhibiting agent selected from the group consisting of phosphoric acid, phosphorus acid, inorganic phosphates, inorganic phosphites, lower alkyl and phenyl esters of phosphoric acid, lower alkyl esters of phosphorous acid, sulphur, inorganic sulphides, organic sulphides selected from the group consisting of benzyl sulphide, tetramethylthiuram disulphide, β-naphthyl disulphide, thioanisole, ethyl sulphide, diphenyl sulphide and methyl sulphide, inorganic sulphites, mercaptans selected from the group consisting of lower alkyl mercaptans, thiophenol and benzylmercaptan, and thio-organic acids selected from thiosalicylic acid, thiobenzoic acids, and thioacetic acid.

2. The process of claim 1 wherein said coloration inhibiting agent is added in an amount of about 0.01–1% by weight to the terephthalonitrile.

3. The process of claim 1 wherein said inorganic phosphate is at least one compound selected from the group consisting of cadmium phosphate, calcium phosphate, sodium phosphate and zinc phosphate.

4. The process of claim 1 wherein said inorganic phosphite is at least one compound selected from the group consisting of cadmium phosphite, calcium phosphite, sodium phosphite, potassium phosphite, and copper phosphite.

5. The process of claim 1 wherein said phosphoric acid ester is at least one compound selected from the group consisting of triphenyl phosphate, trimethyl phosphate, tributyl phosphate, dibutyl hydrogen phosphate and trihexyl phosphate.

6. The process of claim 1 wherein said phosphorous acid ester is at least one compound selected from the group consisting of tributyl phosphite, trihexyl phosphite, diethyl phosphite, triethyl phosphite and monoethyl phosphite.

7. The process of claim 1 wherein said inorganic sulphide is at least one compound selected from the group consisting of sodium sulphide, zinc sulphide, ammonium sulphide, diphosphorus pentasulphide, zinc sulphide, calcium sulphide, copper sulphide, cadmium sulphide, sodium polysulphide, ammonium polysulphide and potassium polysulphide.

8. The process of claim 1 wherein said inorganic sulphite is at least one compound selected from the group consisting of sodium sulphite, zinc sulphite, calcium sulphite, cobalt sulphite, sodium hydrogen sulphite and potassium hydrogen sulphite.

9. The process of claim 1 wherein said mercaptan is at least one compound selected from the group consisting of methylmercaptan, ethylmercaptan, thiophenol and benzylmercaptan.

10. The process of claim 1 wherein said thio-organic acid is at least one compound selected from the group consisting of thio-salicylic acid, thiobenzoic acid, dithiobenzoic acid and thioacetic acid.

References Cited by the Examiner

UNITED STATES PATENTS

| | | | |
|---|---|---|---|
| 2,650,213 | 8/1953 | Hofrichter | 260—75 |
| 2,921,088 | 1/1960 | Gasson et al. | 260—475 |
| 3,171,828 | 3/1965 | Isaacs et al. | 260—475 |

LORRAINE A. WEINBERGER, *Primary Examiner.*

R. K. JACKSON, T. L. GALLOWAY,
*Assistant Examiners.*